United States Patent
Domokos et al.

(10) Patent No.: US 11,699,076 B2
(45) Date of Patent: Jul. 11, 2023

(54) METHOD AND SYSTEM FOR LEARNING RULES FROM A DATA BASE

(71) Applicants: Robert Bosch GmbH, Stuttgart (DE); Carnegie Mellon University, Pittsburgh, PA (US)

(72) Inventors: Csaba Domokos, Simmozheim (DE); Daria Stepanova, Renningen (DE); Jeremy Zieg Kolter, Pittsburgh, PA (US); Po-Wei Wang, Pittsburgh, PA (US)

(73) Assignees: ROBERT BOSCH GMBH, Stuttgart (DE); CARNEGIE MELLON UNIVERSITY, Pittsburgh, PA (US)

( * ) Notice: Subject to any disclaimer, the term of this patent is extended or adjusted under 35 U.S.C. 154(b) by 379 days.

(21) Appl. No.: 16/993,995

(22) Filed: Aug. 14, 2020

(65) Prior Publication Data
US 2021/0089894 A1 Mar. 25, 2021

(30) Foreign Application Priority Data
Sep. 24, 2019 (EP) .................................... 19199308

(51) Int. Cl.
*G06N 3/08* (2023.01)
*G06N 3/04* (2023.01)
*G06N 5/025* (2023.01)

(52) U.S. Cl.
CPC ................. *G06N 3/08* (2013.01); *G06N 3/04* (2013.01); *G06N 5/025* (2013.01)

(58) Field of Classification Search
CPC .......... G06N 3/08; G06N 5/025; G06N 5/022; G06N 3/04
See application file for complete search history.

(56) References Cited

PUBLICATIONS

Cohen et al., "TensorLog: Deep Learning Meets Probabilistic Database" Jul. 17, 2017, arXiv preprint arXiv:1707.05390.*
Abadi et al., "TensorFlow: Large-Scale Machine Learning on Heterogeneous Distributed Systems", Nov. 11, 2015, OSDI'16: Proceedings of the 12th USENIX conference on Operating Systems Design and Implementation, pp. 265-283.*
Zhu et al., "Multiple-Facial Action Unit Recognition by Shared Feature Learning and Semantic Relation Modeling", 2014, 2014 22nd International Conference on Pattern Recognition.*

(Continued)

*Primary Examiner* — Alan Chen
(74) *Attorney, Agent, or Firm* — Norton Rose Fulbright US LLP; Gerard Messina

(57) ABSTRACT

A system and computer implemented method for learning rules from a data base including entities and relations between the entities, wherein an entity is either a constant or a numerical value, and a relation between a constant and a numerical value is a numerical relation and a relation between two constants is a non-numerical relation. The method includes: deriving aggregate values from said numerical and/or non-numerical relations; deriving non-numerical relations from said aggregate values; adding said derived non-numerical relations to the data base; constructing differentiable operators, wherein a differentiable operator refers to a non-numerical or a derived non-numerical relation of the data base, and extracting rules from said differentiable operators.

10 Claims, 4 Drawing Sheets

(56) References Cited

PUBLICATIONS

Dietterich et al., "Machine Learning An Artificial Intelligence Approach, vol. I", 1983, Morgan Kaufmann Publishers, vol. 1.*
Mudgal, et al.: "Deep Learning for Entity Matching : A Design Space Exploration", Proceedings of The 2018 International Conference on Management of Data, SIGMOD '18, Jun. 10-15, 2018, Houston, TX, USA, pp. 1-16, XP055669649.
Cohen William W., et al., "Tensorlog: Deep Learning Meets Probabilistic Databases," Cornell University, 2017, pp. 1-28. arxiv:1707.05390V1.
Yang Fan, et al., "Differentiable Learning of Logical Rules for Knowledge Base Reasoning," Cornell University, 2017, pp. 1-10. arxiv:1702.08367V3.

* cited by examiner

METHOD AND SYSTEM FOR LEARNING RULES FROM A DATA BASE

CROSS REFERENCE

The present application claims the benefit under 35 U.S.C. § 119 of European Patent Application No. EP 19199308.8 filed on Sep. 24, 2019, which is expressly incorporated herein by reference in its entirety.

FIELD

The present invention concerns a system and a computer implemented method for learning rules from a data base comprising entities and relations between said entities, wherein an entity is either a constant or a numerical value, and a relation between a constant and a numerical value is a numerical relation and a relation between two constants is a non-numerical relation.

BACKGROUND INFORMATION

Such data bases are also known as knowledge graphs which are mainly used for graph-based knowledge representation by describing (real world) entities and their relations organized in a graph.

Rules over a knowledge graph capture interpretable patterns in data, such that the rules can be used for prediction, completion and cleaning of knowledge graphs. Several approaches for deriving such rules from a knowledge graph are available. However, they are limited with respect to the treatment of numeric data.

Predictions for an entity of a data base is often based not only on its relation to other entities but also on a summary over a set of such relations commonly expressed by aggregates.

Therefore, it is desirable to learn rules from the data base, which express such aggregates.

SUMMARY

This may be achieved by example devices and methods according to the present invention.

In accordance with an example embodiment of the present invention, a computer implemented method for learning rules from a data base comprising entities and relations between said entities, wherein an entity is either a constant or a numerical value, and a relation between a constant and a numerical value is a numerical relation and a relation between two constants is a non-numerical relation, comprises the steps of:

deriving aggregate values from said numerical and/or non-numerical relations;

deriving non-numerical relations from said aggregate values;

adding said derived non-numerical relations to the data base;

constructing differentiable operators, wherein each differentiable operator refers to a non-numerical or a derived non-numerical relation of the data base, and extracting rules from said differentiable operators using a neural network.

An aggregate value is a single result value from a set of input values. As an aggregate value is a numerical value a relation between an entity being a constant and an entity being an aggregate value is a numerical relation. Instead of adding the aggregate values as new entities in the form of numerical value to the data base non-numerical relations are derived from the aggregate values and added to the data base.

Exemplary details of constructing differentiable operators, also known as TensorLog operators, which enable investigating reasoning over data base facts in a differentiable manner to derive new facts are disclosed for example in the following reference:

COHEN William W., YANG Fan, MAZAITIS Kathryn, "Tensorlog: Deep Learning Meets Probabilistic Databases." CoRR, 2017, abs/1707.05390. However, this approach is limited to the treatment of numeric data.

The method according to the present invention enables advantageously to integrate aggregate values in the rule learning process.

According to an example embodiment, the step of deriving aggregate values from said numerical and/or non-numerical relations comprises applying aggregate functions to said numerical and/or non-numerical relations. Aggregation functions group multiple values together, and can perform a variety of operations on the grouped values to return a single result, herein referred to as an aggregate value.

Preferably, examples of the aggregate function include average, sum, minimum, maximum, count, and various other aggregate functions. The count function is preferably applied to numerical and non-numerical relations. Further aggregate functions, for example average, sum, minimum, and maximum are preferably applied to numerical relations.

According to an example embodiment of the present invention, the step of deriving non-numerical relations from said aggregate values comprises encoding a numerical relation into a non-numerical relation. Thus, a relation between a constant and a numerical value is encoded into a relation between two constants.

According to an example embodiment of the present invention, the step of encoding a numerical relation into a non-numerical relation comprises comparing of entities with respect to numerical relations in which the entities participate. It has been proved beneficial, to compare two or more entities with respect to numerical relations of the same type. Typically, the comparison with respect to numerical relations of different types is irrelevant.

The above cited reference describes exemplary details of constructing differentiable operators, also known as TensorLog operators, wherein in TensorLog all entities are mapped to integers, and each entity i is associated with a one-hot encoded vector $v_i$ such that only it's i-th entry is 1 and the other entries are zeros.

According to an example embodiment of the present invention, the step of constructing differentiable operators comprises constructing matrices, wherein a matrix refers to a non-numerical relation. Preferably, a matrix is constructed for every non-numerical relation. Preferably, the matrix is an i-by-i matrix, wherein an entry (j, k) is non-zero, for example 1, if the relation is a relation between the entity j and entity k, otherwise an entry is zero.

According to an example embodiment of the present invention, the step of constructing differentiable operators comprises constructing negated differentiable operators. Preferably, constructing negated differentiable operators comprises constructing negated matrices, wherein a negated matrix refers to a negated non-numerical relation. The negation of a matrix can be obtained by flipping all zeros to ones and vice versa such that the corresponding (sparse) matrix results in a dense matrix. Since dense matrices cannot be materialized in TensorLog, negated relations are not supported directly by the approach known from the cited reference. Therefore, according to a preferred embodiment of the present invention, the construction of negated differentiable operators comprises constructing negated matrices by flipping only the elements in such rows that contain at least one non-zero element.

According to an example embodiment of the present invention, the step of extracting rules from the differentiable operators comprises using an artificial neural network, particularly an artificial neural network constructed based on neural logic programming, LP, framework.

Exemplary details of the neural logic programming, LP, framework and the training of such a framework for learning rules are disclosed for example in the following reference:

YANG Fan, YANG Zhilin and COHEN, William W., "Differentiable Learning of Logical Rules for Knowledge Base Reasoning." NeurIPS, 2017, pages 2316 to 2325.

According to an example embodiment of the present invention, the step extracting rules from said differentiable operators using a neural network is restricted by a maximum number of relations allowed in a rule.

According to an example embodiment of the present invention, the rules extracted from the differentiable operators are horn rules, wherein said method further comprises the step of decoding said rules into decoded rules. The horn rules extracted from the differentiable operators using the neural logic programming, LP, framework do not comprise the aggregate values and/or negations. By decoding the horn rules, they can be advantageously decoded into rules with aggregate values and/or rules with negations.

According to an example embodiment of the present invention, the method further comprises the step of applying said rules and/or said decoded rules to predict one or more relations between two or more entities of the data base.

The present invention also concerns an example system configured for learning rules from a data base comprising entities and binary relations between said entities, wherein the system comprises a processing unit configured to perform the method according to any of the embodiments. The processing unit may be a distributed computing system, a microprocessor or a microcontroller.

According to an example embodiment of the present invention, the system comprises a memory, in particular computer readable non-volatile memory, wherein the processing unit and the memory interact via a data line.

According to an example embodiment of the present invention, the memory comprises computer readable instructions that when executed by the processing unit cause the processing unit to execute the method for learning rules from a data base according to the above described embodiments.

According to an example embodiment of the present invention, the system may comprise the database or connect to a further memory in which the data base is stored such that the processing unit has access to the data of the data base when performing the method according to the embodiments.

According to an example embodiment of the present invention, the system further comprises a processing unit and a memory unit for an artificial neural network, particularly an artificial neural network constructed based on neural logic programming (neural LP) framework, configured to perform the step according to an embodiment.

Exemplary details of the neural logic programming, LP, framework and the training of such a framework for learning rules are disclosed in the above cited reference.

The present invention also concerns a computer program, wherein the computer program comprises computer readable instructions that when executed by a computer cause the computer to execute the method according to the embodiments.

The present invention also concerns a computer program product, wherein the computer program product comprises a computer readable storage medium comprising the computer program according to the embodiments.

The present invention also concerns use of a method according to the embodiments and/or a system according to the embodiments and/or a computer program according to the embodiments and/or a computer program product according to the embodiments for predicting relations between entities of a data base and/or cleaning of a data base and/or completion of a data base.

Further advantageous embodiments of the present invention are derived from the following description and the figures.

DETAILED DESCRIPTION OF EXAMPLE EMBODIMENTS

Figure 1:
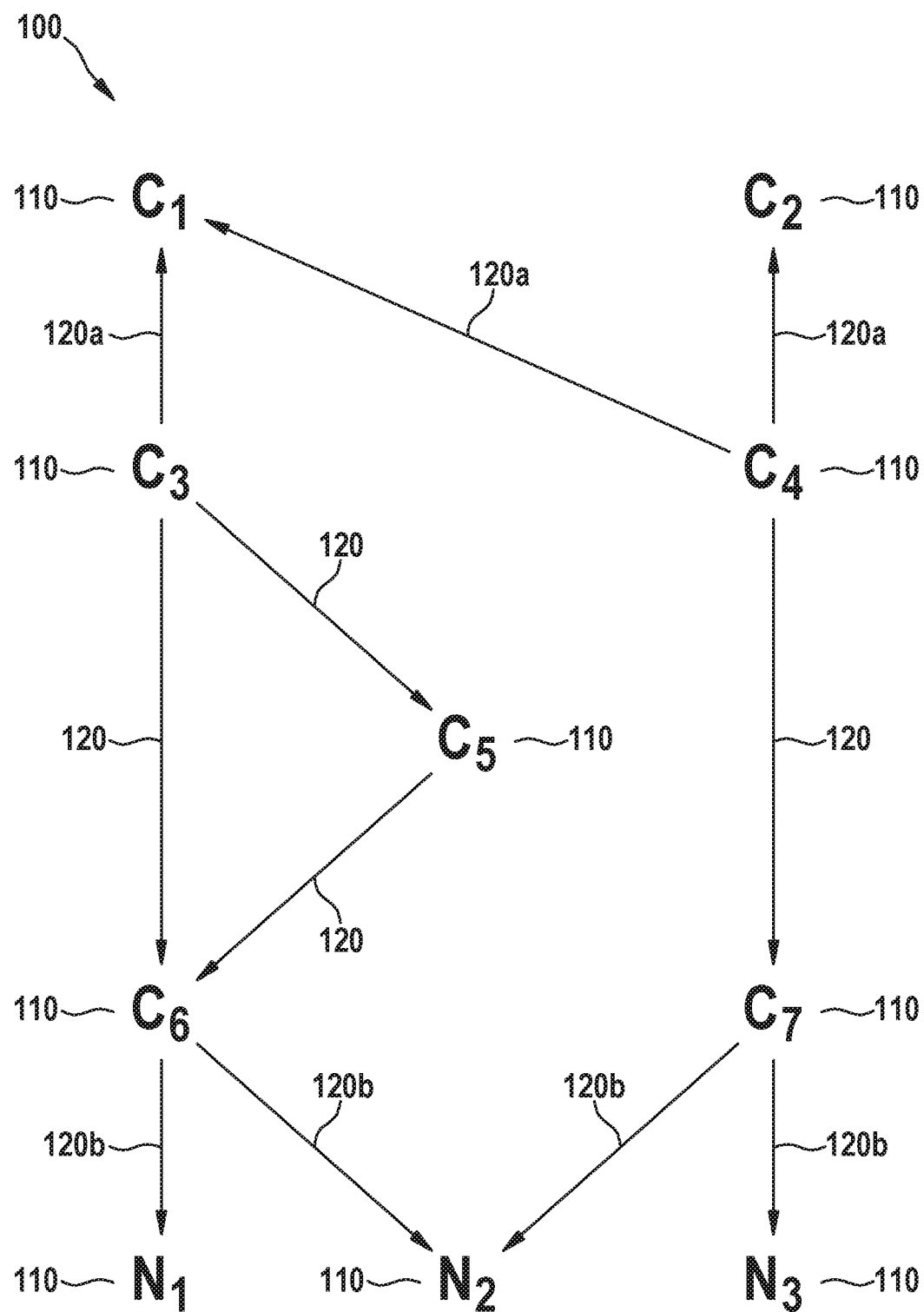
FIG. 1 depicts a schematic view of a data base according to a first embodiment of the present invention.

FIG. 1 depicts a schematic view of a data base 100 according to a first embodiment of the present invention.

Such data bases 100 are also known as knowledge graphs which are mainly used for graph-based knowledge representation by describing (real world) entities and their relations organized in a graph.

It should be noted that FIG. 1 is an exemplary schematic extract of a data base 100 to allow for describing by example the method and system of the present invention, wherein the method and system described herein can be applied to large-scale real world knowledge graphs, which may contain millions and billions of facts.

According to the example embodiment, the data base 100 comprises entities 110 and relations 120 between the entities 110. Entities C1, C2, C3, C4, C5, C6 and C7 of the data base 100 are constants. Entities N1, N2, N3 are numerical values. A relation 120 between a constant and a numerical value is referred to as a numerical relation and a relation 120 between two constants is referred to as a non-numerical relation.

For example, entity C3 is a first person and entity C4 is a second person. Entity C1 is a first article and entity C2 is a second article. The relation 120a between the entity C3 and the entity C2 is for example "cited in", which in this case means that the first person is cited in the first article. Further, the relation 120a between the entity C4 and the entity C1 as well as the relation 120a between the entity C4 and the entity C2 is for example also "cited in", which in this means that the second person is cited in the first article as well as in the second article. According to this example, the relation 120a is a non-numerical relation.

For example, entity C6 is a first patent and entity C7 is a second patent. Numerical value N1 has the value "1", numerical value N2 has the value "2" and numerical value N3 has the value "3". The relation 120b between the entity C6 and the entity N1 as well as the relation 120b between the entity C6 and the entity N2 is for example "has Rating", which means in this case that the first patent has rating "1" as well as rating "2". Further, the relation 120b between the entity C7 and the entity N2 as well as the relation 120b between the entity C7 and the entity N3 is for example "has Rating", which means in this case that the second patent has rating "2" as well as rating "3". According to this example, the relation 120b is a numerical relation.

Rules over a data base 100 capture interpretable patterns in data, such that the rules can be used for prediction, completion and cleaning of the data base 100. Predictions for an entity 110 of a data base 100 is often based not only on its relation 120 to other entities 110 but also rather on a summary over a set of such relations commonly expressed by aggregates.

Therefore, it is desirable to learn rules from the data base, which express such aggregates.

Figure 3:
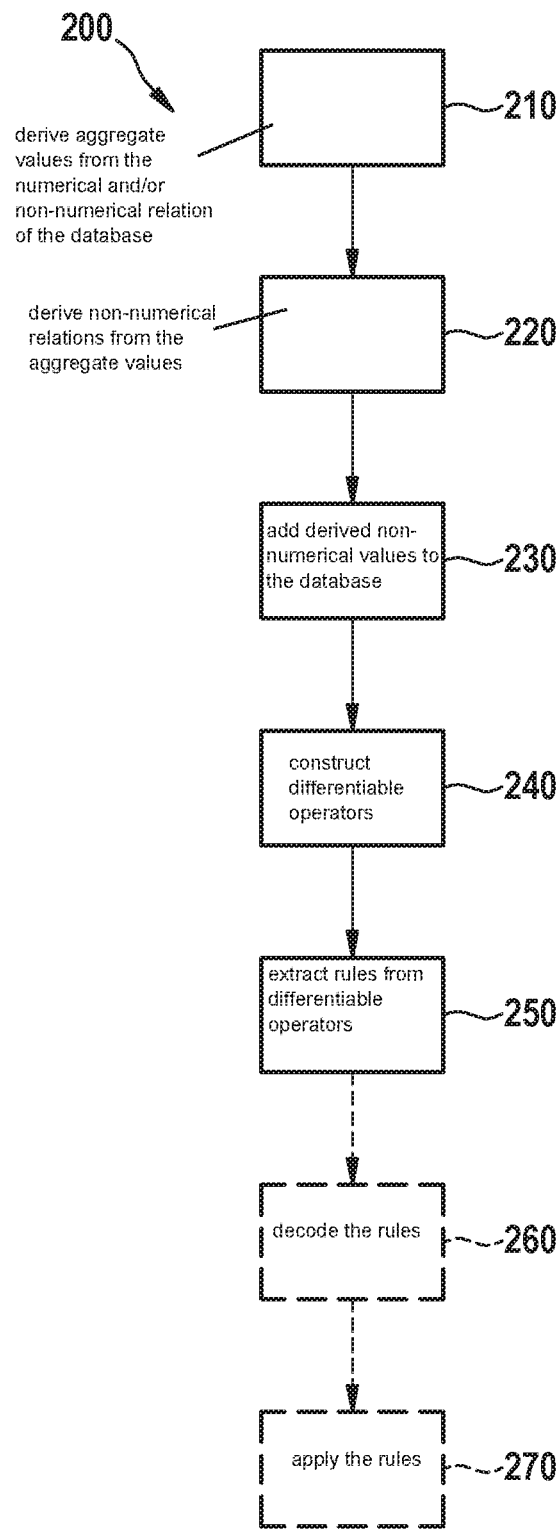
FIG. 3 depicts first aspects of computer-implemented method for learning rules from a data base in accordance with an example embodiment of the present invention.

FIG. 3 depicts first aspects of computer-implemented method 200 for learning rules from a data base 100 in accordance with an example embodiment of the present invention.

According to one aspect of the present invention, when the computer implemented method 200 starts, a step 210 of deriving aggregate values from said numerical and/or non-numerical relations of the data base 100 is executed. An aggregate value is a single result value from a set of input values.

According to one aspect of the present invention, the step of deriving 210 aggregate values from said numerical and/or non-numerical relations comprises applying aggregate functions on said numerical and/or non-numerical relations. Aggregate functions compute a single result value, aggregate value, from a set of input values. Preferably, examples of the aggregate function include average, sum, minimum, maximum, count, and various other aggregate functions the count function is preferably applied to numerical and non-numerical relations. Further aggregate functions, for example average, sum, minimum and maximum, are preferably applied to numerical relations.

Applying the step 210 to the above described example means for example applying the count function to the non-numerical relation 120a "cited in".

Entity C3 is cited once and entity C4 is cited twice. According to this example, the aggregate value "1" and "2" are derived from the relation 120a.

Further, applying the average function to the numerical relation 120b "has rating" results in aggregate value "1.5" for entity C6 and aggregate value "2.5" for entity C7.

Afterwards, step 220 is executed.

In the step 220, non-numerical relations are derived from said aggregate values.

As an aggregate value is a numerical value a relation between an entity being a constant and an entity being an aggregate value is a numerical relation. Instead of adding the aggregate values as new entities in the form of numerical value to the data base 100 in step 220 non-numerical relations are derived from the aggregate values.

According to one aspect of the present invention, the step of deriving 220 non-numerical relations from said aggregate values comprises encoding a numerical relation into a non-numerical relation. Thus, a relation between a constant and a numerical value is encoded into a relation between two constants.

According to one aspect of the present invention, the step of encoding a numerical relation into a non-numerical relation comprises comparing of entities with respect to numerical relations in which the entities participate. It has been proved beneficial to compare two or more entities with respect to numerical relations of the same type. Typically, the comparison with respect to numerical relations of different types is irrelevant.

Applying the step 210 to the above described example means for example to compare entity C6 and C7 with regard to their average ratings. As entity C6 comprises an average rating of "1.5" and entity C7 comprises an average rating of "2.5", a non-numerical relation of "less rated" or "more rated" respectively can be derived from these aggregate values.

Further, applying the step 210 to the above described example means for example to compare entity C3 and C4 with regard to the amount of citations. As entity C3 is cited once and C4 is cited twice a non-numerical relation of "more cited" or "less cited" respectively can be derived from the aggregate values.

Afterwards, step 230 is executed.

In the step 230, the non-numerical relations derived from the aggregate values are added to the data base. Instead of adding the aggregate values as new entities in the form of numerical value to the data base non-numerical relations are derived from the aggregate values as described above and then added to the data base.

Figure 2:
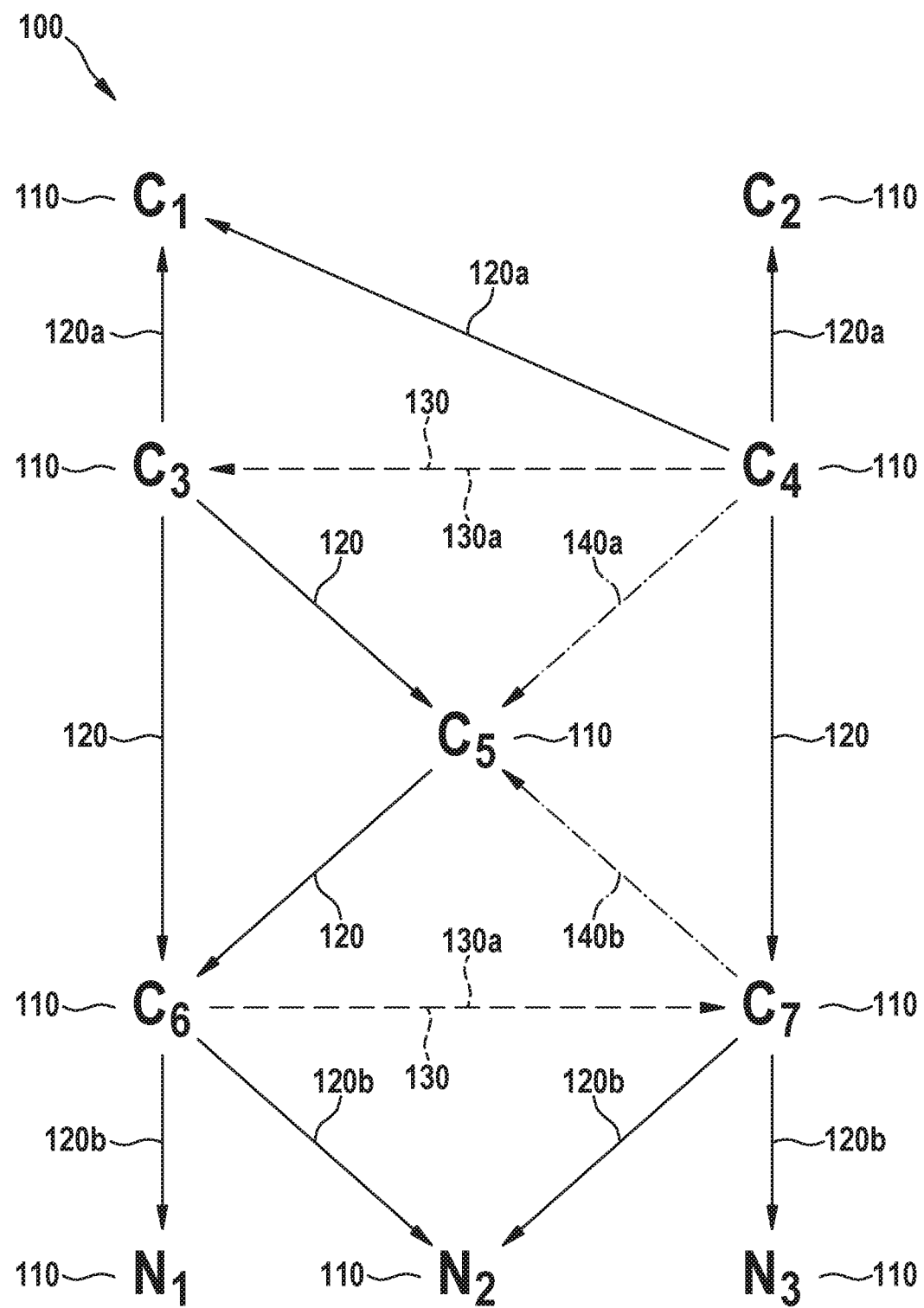
FIG. 2 depicts a schematic view of a data base according to a second embodiment of the present invention.

FIG. 2 depicts a data base 100 according to a second embodiment of the present invention, wherein derived non-numerical relations 130 has been added.

With reference to the example above, the derived non-numerical relation 130a "more cited" between entity C4 and C3 and the derived non-numerical relation 130b "less rated" between the entity C6 and C7 have been added.

Afterwards, 240 is executed.

In the step 240, differentiable operators are constructed, wherein a differentiable operator refers to a non-numerical relation or a derived non-numerical relation of the data base.

Exemplary details of constructing differentiable operators, also known as TensorLog operators, which enable investigating reasoning over data base facts in a differentiable manner to derive new facts are disclosed for example in the following reference:

COHEN William W., YANG Fan, MAZAITIS Kathryn, Tensorlog: "Deep Learning Meets Probabilistic Databases." CoRR, 2017, abs/1707.05390, which connects rule application with sparse matrix multiplications. In TensorLog all entities are mapped to integers, and each entity i is associated with a one-hot encoded vector $v_i$ such that only it's i-th entry is 1 and the other entries are zeros.

According to one aspect of the present invention, the step of constructing 240 differentiable operators comprises constructing matrices $M_R$, wherein a matrix $M_R$ refers to a non-numerical relation. Preferably, for every non-numerical relation a Matrix $M_R$ is constructed. Preferably, the matrix $M_R$ is an i-by-i matrix, wherein an entry (j, k) is non-zero, for example 1, if the relation is a relation between the entity j and the entity k, otherwise the entry is zero.

According to one aspect of the present invention, the step of constructing 240 differentiable operators comprises constructing negated differentiable operators. Preferably, constructing negated differentiable operators comprises constructing negated matrices $M_{Rneg}$, wherein a matrix $M_{Rneg}$ refers to a negated non-numerical relation. The negation of a matrix $M_R$ can be obtained by flipping all zeros to ones and vice versa such that the corresponding (sparse) matrix $M_R$ results in a dense matrix. Since dense matrices cannot be materialized in TensorLog, negated relations are not supported directly by the approach known from the cited reference. Therefore, to construct negated differentiable operators, the negated matrices $M_{Rneg}$ are constructed by flipping only the elements in such rows that contain at least one non-zero element. The construction of the negated differentiable operators is performed under the assumption that it can be only concluded that a negated relation between a pair of entities is true if their already exist an associated non negated relation between this pair of entities. Otherwise, the negated relation remains unknown.

Afterwards, 250 is executed.

In the step 250, rules are extracted from said differentiable operators.

According to one aspect of the present invention, the step of extracting 250 rules from the differentiable operators comprises using an artificial neural network, particularly an artificial neural network constructed based on neural logic programming, LP, framework.

Exemplary details of the neural logic programming, LP, framework and the training of such a framework for learning rules are disclosed for example in the following reference:

ZHANG Fan, YANG Zhilin and COHEN, William W., "Differentiable Learning of Logical Rules for Knowledge Base Reasoning." NeurIPS, 2017, pages 2316 to 2325.

In contrast to the approaches described in the above cited references, the example computer-implemented method 200 in accodance with the present invention has the following advantages:

By performing the steps of deriving 210 aggregate values from said numerical and/or non-numerical relations, deriving 220 non-numerical relations from said aggregate values, adding 230 said derived non-numerical relations to the data base and constructing 240 differentiable operators based on a derived non-numerical relation, the present invention allows to compile numerical relations into differentiable operators. Therefore, the method according to the present invention enables to utilize a respective comparison information effectively and incorporate it into the rule learning process.

In contrast, the direct incorporation of numerical relations into the differentiable operators would result in dense matrices, wherein their materialization and storage in the memory of a processor is unfeasible.

Further, the present invention allows to construct negated differentiable operators which can be materialized in the approaches known from prior art.

According to one aspect of the present invention, the rules extracted from the differentiable operators are horn rules, and the method 200 further comprises the step of decoding 260 said rules into decoded rules. The horn rules extracted from the differentiable operators using the neural logic programming, LP, framework do not comprise the aggregate values and/or negations. By decoding 260 the horn rules, they can by advantageously decoded into rules with aggregate values and/or negations.

For example, a rule which can be extracted by method 200 can be for example "a person is influenced by a person which is cited more often in an article than another person". After decoding, this rule reads to "a person is influenced by a person which is cited at least two times in an article".

A further rule which can be extracted by method 200 can be for example "a patent is relevant for a person, if this patent has a higher rating than another patent". After decoding, this rule reads to "a patent which is has a higher rating than 2 is relevant for a person."

According to one aspect of the present invention, the method 200 further comprises the step of applying 270 said rules and/or said decoded rules to predict one or more relations 140 between two or more entities 110 of the data base 100. Referring now to FIG. 2, for example relations 140 between entity C4 and entity C5 and between entity C5 and entity C7 have been predicted by applying 210 the rules.

Referring again to the above described example, a rule that can be extracted and/or decoded by method 200 can be for example "a person is influenced by a person which is cited at least two times in an article". Entity C3 is cited once and entity C4 is cited twice. Applying now the rule to the data base 100 we can predict the relation 140a "influences" between entity C4 and C5. Another rule can be for example "a patent which is has a higher rating than 2 is relevant for a person". Entity C6 has rating "1.5" and entity C7 has rating "2.5". Applying now the rule to the data base 100 we can be predict the relation 140b "is relevant" between entity C7 and C5.

Figure 4:
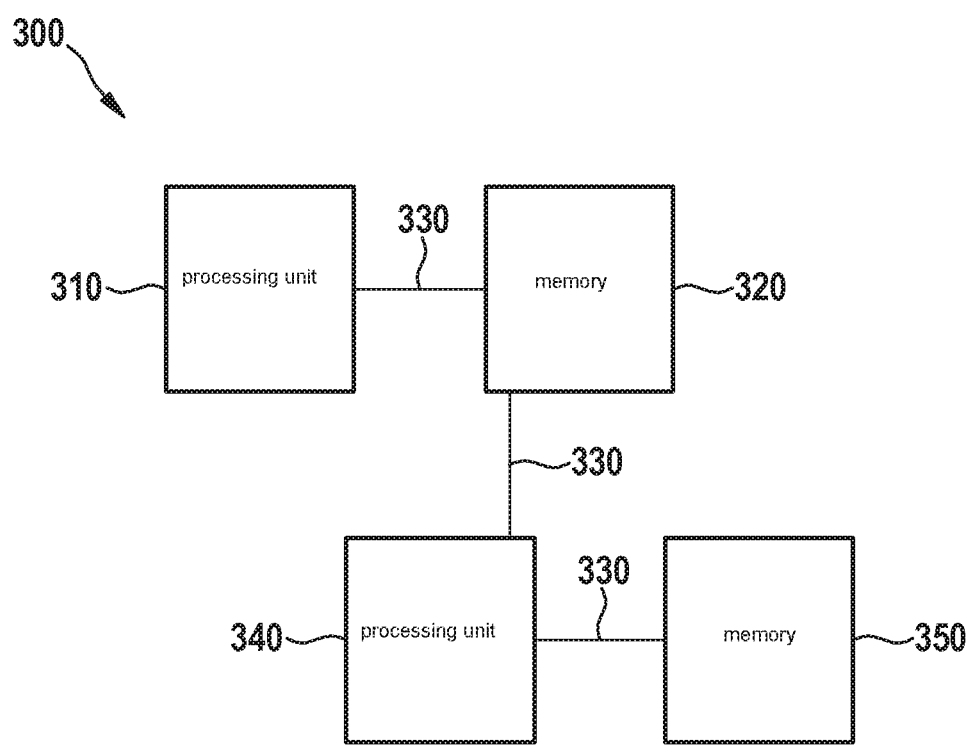
FIG. 4 depicts aspects of a system configured for learning rules from a data base in accordance with an example embodiment of the present invention.

According to one aspect of the present invention, the method 200 may be performed by a system 300 configured for learning rules from a data base 100 comprising entities 110 and binary relations 120 between said entities as depicted in FIG. 4.

In one aspect of the present invention depicted in FIG. 4, the system 300 comprises a processing unit 310 configured to perform the method 200 according to embodiments.

In one aspect of the present invention, the system comprises a memory 320, in particular computer readable non-volatile memory 320, wherein the processing unit 310 and the memory 320 interact via a data line 330. The processing unit 310 may be a distributed computing system, a microprocessor or a microcontroller.

In one aspect of the present invention, the memory 320 comprises computer readable instructions that when executed by the processing unit 310 cause the processing unit 310 to execute the method 200 for learning rules from a data base according to the above described embodiments.

In one aspect of the present invention, the system 300 may comprise the database 100 or connect to a further memory, not depicted in FIG. 4, in which the data base 100 is stored such that the processing unit 310 has access to the data of the data base 100 when performing the method 200.

According to one aspect of the present invention, the system 300 further comprises a processing unit 340 and a memory 350 for an artificial neural network, configured to perform the step 250 of extracting rules from said differentiable operators as described above.

In one aspect of the present invention, the processing 340 for the artificial network is connect via a data line 330 with the memory 320.

In one aspect of the present invention, the artificial neural network is constructed based on neural logic programming, LP, framework. Exemplary details of the neural logic programming, LP, framework and the training of such a framework for learning rules are disclosed for example in the above cited reference.

In one aspect of the present invention, a method 200 according to the above described embodiments and/or a system 300 according to the above described embodiments and/or a computer program according to the above described embodiments and/or a computer program product according to the above described embodiments may be used for predicting relations 120 between entities 110 of a data base 100 and/or cleaning of a data base 100 and/or completion of a data base 100.

What is claimed is:

1. A computer implemented method for learning rules from a data base, the data base including entities and binary relations between pairs of the entities, wherein each of the entities is either a non-numerical constant or a numerical value, and each binary relation of the binary relations between a non-numerical constant and a numerical value is a numerical binary relation and each binary relation of the binary relations between two non-numerical constants is a non-numerical binary relation, the method comprising the following steps:
deriving aggregate values from the numerical binary relations of the binary relations of the data base and/or the non-numerical binary relations of the binary relations of the data base;
deriving non-numerical binary relations from the aggregate values;
adding each of the derived non-numerical binary relations to the data base as a binary relation between two of the entities of the data base;
constructing differentiable operators, wherein each of the differentiable operators refers to a non-numerical binary relation of the data base or a derived non-numerical binary relation of the data base;
extracting rules from the differentiable operators using an artificial neural network based on neural logic programming (LP) framework, wherein the rules extracted from the differentiable operators are horn rules;
decoding the rules into decoded rules; and
predicting one or more relations between two or more entities of the data base by applying the rules and/or the decoded rules to the two or more entities of the data base.

2. The method according to claim 1, wherein the step of deriving the aggregate values from the numerical binary relations and/or the non-numerical binary relations includes applying aggregate functions on the numerical binary relations and/or the non-numerical binary relations.

3. The method according to claim 1, wherein the step of deriving the non-numerical binary relations from the aggregate values includes encoding a numerical binary relation into a non-numerical binary relation.

4. The method according to claim 3, wherein the step of encoding the numerical binary relation into the non-numerical binary relation includes comparing entities with respect to numerical binary relations in which the entities participate.

5. The method according to claim 1, wherein the step of constructing the differentiable operators includes constructing matrices, wherein each of the matrices refers to a non-numerical binary relation.

6. The method according to claim 1, wherein the step of constructing the differentiable operators includes constructing negated differentiable operators, the negated differentiable operators including negated matrices, wherein a negated matrix refers to a negated non-numerical binary relation.

7. A system configured for learning rules from a data base, the data base including entities and binary relations between pairs of the entities, wherein each of the entities is either a non-numerical constant or a numerical value, and each binary relation of the binary relations between a non-numerical constant and a numerical value is a numerical binary relation and each binary relation of the binary relations between two constants is a non-numerical binary relation, the system comprising:
a processing unit configured to:
derive aggregate values from the numerical binary relations of the binary relations of the data base and/or the non-numerical binary relations of the binary relations of the data base;
derive non-numerical binary relations from the aggregate values;
add each of the derived non-numerical binary relations to the data base as a binary relation between two of the entities of the data base;
construct differentiable operators, wherein each of the differentiable operators refers to a non-numerical binary relation of the data base or a derived non-numerical binary relation of the data base;
extract rules from the differentiable operators using an artificial neural network based on neural logic programming (LP) framework, wherein the rules extracted from the differentiable operators are horn rules;
decode the rules into decoded rules; and
predict one or more relations between two or more entities of the data base by applying the rules and/or the decoded rules to the two or more entities of the data base.

8. The system according to claim 7, further comprising:
a processing unit and a memory unit for the artificial neural network configured to extract the rules from the differentiable operators.

9. A non-transitory computer readable storage medium on which is stored a computer program for learning rules from a data base, the data base including entities and binary relations between pairs of the entities, wherein each of the entities is either a non-numerical constant or a numerical value, and each binary relation between a non-numerical constant and a numerical value is a numerical binary relation and each binary relation between two non-numerical constants is a non-numerical binary relation, the computer program, when executed by a computer, causing the computer to perform the following steps:
deriving aggregate values from the numerical binary relations of the binary relations of the data base and/or the non-numerical binary relations of the binary relations of the data base;
deriving non-numerical binary relations from the aggregate values;
adding each of the derived non-numerical binary relations to the data base as a binary relation between two of the entities of the data base;
constructing differentiable operators, wherein each of the differentiable operators refers to a non-numerical binary relation of the data base or a derived non-numerical relation of the data base;
extracting rules from the differentiable operators using an artificial neural network based on neural logic programming (LP) framework, wherein the rules extracted from the differentiable operators are horn rules;
decode the rules into decoded rules; and
predict one or more relations between two or more entities of the data base by applying the rules and/or the decoded rules to the two or more entities of the data base.

10. A method, comprising:
providing a system configured for learning rules from a data base, the data base including entities and binary relations between the entities, wherein each of the entities is either a non-numerical constant or a numerical value, and each binary relation between a non-numerical constant and a numerical value is a numerical binary relation and each binary relation between two non-numerical constants is a non-numerical binary relation, the system including:

a processing unit configured to:
  derive aggregate values from the numerical binary relations of the binary relations of the data base and/or the non-numerical binary relations of the binary relations of the data base;
  derive non-numerical binary relations from the aggregate values;
  add the derived non-numerical binary relations to the data base as a binary relation between two of the entities of the data base;
  construct differentiable operators, wherein each of the differentiable operators refers to a non-numerical binary relation of the data base or a derived non-numerical binary relation of the data base; and
  extract rules from the differentiable operators using an artificial neural network based on neural logic programming (LP) framework, wherein the rules extracted from the differentiable operators are horn rules;
  decode the rules into decoded rules; and
  predict one or more relations between two or more entities of the data base by applying the rules and/or the decoded rules to the two or more entities of the data base;

using the system to predict relations between entities of the data base and/or clean the data base and/or complete the data base.

* * * * *